United States Patent [19]

Lach

[11] 4,390,340
[45] Jun. 28, 1983

[54] TANNING AGENT, ITS PREPARATION AND ITS USE FOR RETANNING

[75] Inventor: Dietrich Lach, Friedelsheim, Fed. Rep. of Germany

[73] Assignee: BASF Aktiengesellschaft, Ludwigshafen, Fed. Rep. of Germany

[21] Appl. No.: 279,006

[22] Filed: Jun. 30, 1981

Related U.S. Application Data

[63] Continuation of Ser. No. 80,038, Sep. 28, 1979, abandoned.

[30] Foreign Application Priority Data

Oct. 4, 1978 [DE] Fed. Rep. of Germany ....... 2843233

[51] Int. Cl.³ .................... C14C 3/18; C08G 12/08; C14C 3/16; C07C 101/48
[52] U.S. Cl. .................. 8/94.24; 8/94.21; 252/8.57; 525/473; 525/491; 525/495; 525/499; 525/515; 528/129; 528/150; 528/158; 528/161; 528/263; 528/265; 528/266
[58] Field of Search ............... 8/94.21, 94.24; 252/8.57; 525/473, 491, 495, 499, 515; 528/129, 150, 158, 161, 263, 265, 266

[56] References Cited

U.S. PATENT DOCUMENTS

| | | | |
|---|---|---|---|
| 1,222,033 | 4/1917 | Romer | 528/150 |
| 2,282,536 | 5/1942 | Swain | 528/265 |
| 3,206,435 | 9/1965 | Heyden et al. | 528/257 |
| 3,852,374 | 12/1974 | Erdmann et al. | 528/150 |
| 3,899,468 | 8/1975 | Rotts | 528/263 |

FOREIGN PATENT DOCUMENTS

858559 12/1952 Fed. Rep. of Germany.
1247328 2/1968 Fed. Rep. of Germany.
515517 12/1979 United Kingdom .............. 528/150

Primary Examiner—John C. Bleutge
Assistant Examiner—Herbert J. Lilling
Attorney, Agent, or Firm—Oblon, Fisher, Spivak, McClelland & Maier

[57] ABSTRACT

Mineral tanned leather is frequently retanned with synthetic tanning agents to improve the fullness and softness, but leather retanned by the prior art methods is difficult to dye in full shades with anionic dyes. According to the invention, condensation products of $C_{1-4}$ aldehydes with certain aromatic sulfonic acids or carboxylic acids containing amino groups are employed for retanning, thereby improving the receptivity of the leather for anionic dyes. These acids have the general formula

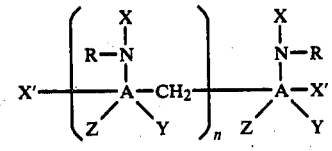

where X and X' are independently H, $-CH_2-SO_3H$ or $-CH_2-OH$, A is a benzene radical, Y and Z are independently H, $-SO_3H$ or $-CO_2H$, R is H or $C_{1-4}$-alkyl and n is from 0 to 10, with the proviso that at least one sulfonic acid or carboxyl group is present in the molecule.

14 Claims, No Drawings

TANNING AGENT, ITS PREPARATION AND ITS USE FOR RETANNING

This is a continuation of application Ser. No. 080,038, filed Sept. 28, 1979, now abandoned.

The present invention relates to a tanning agent based on a condensate of an aromatic sulfonic acid and/or carboxylic acid and a low molecular weight aldehyde. The tanning agent in particular improves the receptivity of leather, tanned or retanned with the said agent, for anionic dyes.

Synthetic tanning agents prepared by condensing aromatic sulfonic acids with aldehydes, especially with formaldehyde, have been disclosed. They give soft, well-filled leather and are simple to use. However, the leather tanned or retanned with these agents is difficult to dye in full shades with anionic dyes.

Further, British Pat. No. 747,090 discloses synthetic tanning agents which are prepared by condensing aromatic amines with aldehydes, especially with formaldehyde. These products are free from sulfonic acid groups so that they are absorbed efficiently on the leather on increasing the pH during tanning. However, they have not found acceptance in practice, presumably because of technical difficulties in use.

The present invention seeks to provide tanning agents, especially for retanning of mineral-tanned leather, which impart to the leather the softness and fullness achievable by the prior art but at the same time impart good receptivity for anionic dyes, and which are furthermore simple to use, without having to modify the conventional tanning methods.

We have found that good results may be achieved with tanning agents based on condensates of aromatic acids containing amino groups with aldehydes. According to the invention there is provided a tanning agent prepared by condensing an aromatic aminocarboxylic acid or, preferably, aminosulfonic acid of the general formula

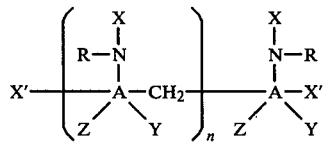

where X and X' are independently H, —CH$_2$—SO$_3$H or —CH$_2$—OH, A is a benzene radical, Y and Z are independently H, —SO$_3$H or —CO$_2$H, R is H or C$_{1-4}$-alkyl and n is from 0 to 10, with the proviso that one or more of the radicals, X, X', Y or Z is a sulfonic acid or carboxyl group (in the case of Y and Z) or contains a sulfonic acid group (in the case of X and X'), i.e. at least one sulfonic acid or carboxyl group is present in the molecule, preferably where A is a benzene radical, X is —CH$_2$—SO$_3$H, X' is H or —CH$_2$—SO$_3$H, Y is H or —CH$_3$, Z is H, R is H and n is 0, with a C$_{1-4}$-aldehyde, preferably with formaldehyde. The amount of aldehyde used is generally from 0.5 to 6, preferably from 1 to 3, moles per mole of amino-containing aromatic starting compound of the above general formula. During condensation, the pH is from 1 to 8, preferably from 3.5 to 8, especially from 5 to 7.5.

Examples of starting materials of the above general formula are the various isomeric anilinesulfonic acids and toluidinesulfonic acids, phenylaminomethanesulfonic acid, toluylaminomethanesulfonic acid and the corresponding compounds with carboxyl groups instead of sulfonic acid groups. Further suitable materials to use are the corresponding compounds having two sulfonic acid or carboxyl groups, or having one sulfonic acid group and one carboxyl group. In principle, all isomers of the said compounds may be used. Preferred compounds are 4-aminobenzenesulfonic acid (sulfanilic acid), 3-aminobenzenesulfonic acid (metanilic acid), o-toluylaminomethanesulfonic acid and especially aminomethanesulfonic acids derived from benzene, but also from the condensates of anilines or of o-toluidine with formaldehyde, such as are for example obtained industrially as a distillation residue from the preparation of 4,4'-diamino-diphenylmethane or 4,4'-diamino-3,3'-dimethyldiphenylmethane.

To improve the fullness and softness of the leather, one or more of the following compounds may additionally be present during condensation of the above aminosulfonic acids or aminocarboxylic acids: phenols, naphthols, methyl derivatives of phenols and naphthols, phenolsulfonic acids, naphtholsulfonic acids, naphthalenesulfonic acids, dicyandiamide, biuret, melamine and especially urea, or, preferably, the condensation products of any of these compounds with formaldehyde, obtainable by condensing the said compounds with formaldehyde in aqueous solution by conventional methods. The total amount of these additionally used compounds should be not more than 90% by weight, preferably not more than 70% by weight, based on the aromatic aminosulfonic acids or aminocarboxylic acids.

The aromatic sulfonic acid or carboxylic acid, containing an amino group, can be employed in the reaction with the aldehyde of 1 to 4 carbon atoms as the monomer either directly or, preferably, after precondensation with formaldehyde. The precondensation is advantageously carried out using a molar ratio of amino-containing sulfonic acid or carboxylic acid to formaldehyde of from 1:0.5 to 1:6, preferably from 1:1 to 1:6, especially from 1:1 to 1:3, in aqueous solution at from 50° to 100° C., preferably from 80° to 100° C., at a pH of from 1 to 8. From 1 to 6 moles of sodium bisulfite may additionally be present, in order to introduce sulfonic acid groups. Predominantly, aminomethanesulfonic acids are thereby formed.

If, for example, anilinesulfonic acids are used as the starting materials and a precondensation with formaldehyde is not employed, the tanning agent may be prepared as follows:

An aqueous solution, preferably of about 30% strength, of, for example, formaldehyde is added, whilst stirring, to an aqueous solution of the anilinesulfonic acid at from 30° to 60° C. and at pH 1–8, preferably 4.5–6. The mixture is then stirred at 80°–100° C. until the desired degree of condensation has been reached; this requires from ½ to 24, preferably from 1 to 12, hours. The degree of condensation can be discerned, for example, from the increasing viscosity of the reaction mixture.

The preparation of the tanning agent is carried out similarly if instead of an anilinesulfonic acid a formaldehyde condensation product of an aromatic amino-containing sulfonic acid or carboxylic acid is employed for the condensation with the C$_{1-4}$-aldehyde.

In an alternative advantageous procedure, a mixture of (a) the reaction product of aniline or toluidine with from 1 to 6 moles of formaldehyde and from 1 to 6 moles of sodium bisulfite is heated with (b) an aqueous solution, containing free formaldehyde, of a condensation product of formaldehyde with from 0.3 to 1 mole of urea and from 0.1 to 0.3 mole of melamine per mole of formaldehyde, in the weight ratio of component (a) to component (b) (each calculated as solids) of from 1:0.5 to 1:5, preferably from 1:1 to 1:3, in aqueous solution at a pH of from 3.5 to 8 for from 1 to 10 hours at 60°-100° C.

The solution obtained can be employed as such for retanning of mineral-tanned hides; alternatively, the tanning agent can be isolated in the conventional manner, for example by salting out or spray-drying.

If it is desired to carry out a co-condensation of naphthols, phenols, their sulfonic acids or naphthalenesulfonic acids, it is advisable either first to precondense the anilinesulfonic acid or the naphthalene, naphthol or phenol component with a small amount of formaldehyde and only then to carry out the co-condensation. It is particularly advantageous first to carry out a precondensation with formaldehyde in the case of both components of the co-condensation.

In addition to formaldehyde, suitable aldehydes for the actual condensation claimed include acetaldehyde, propionaldehyde and n- and i-butyraldehyde.

Examples of suitable phenols are naphthols for use as optional additional component are phenol, cresol, xylenol, p,p'-dihydroxydiphenylsulfone, p,p'-dihydroxydiphenylmethane, naphthol and the various isomeric methylnaphthols. Phenol is particularly preferred. Examples of suitable phenolsulfonic acids, naphtholsulfonic acids or naphthalenesulfonic acids are the sulfonic acid mixtures which are obtained on sulfonating phenol, cresol, xylenol, naphthol, the isomeric methylnaphthols and naphthalene. The sulfonation products of phenol, naphthol and naphthalene are preferred.

For the purposes of the invention, mineral-tanned hides are in the main chrome-tanned hides.

The tanning agents according to the invention may be used under conventional retanning conditions. The tanning agent may be employed either in solution, or undissolved or in suspension, ie. it may be added to the tanning liquor in which it dissolves. The length of the liquor is from 30 to 1,000, preferably from 100 to 400, percent, based on the shaved weight of the leather to be retanned. The pH during retanning is as a rule from 4.0 to 6.5, preferably from 4.5 to 5.5. The temperature should be from 20° to 60° C., preferably from 35° to 50° C. A retanning time of from 15 to 120 minutes, preferably from 30 to 60 minutes, is usual. As a rule, from 0.5 to 10, preferably from 1 to 5, percent, based on the shaved leather weight, of the tanning agent are employed. The tanning agent may be added before, together with or after the dye. Particularly level dyeings are obtained if the tanning agent and dye are added simultaneously. The advantages of the process according to the invention manifest themselves particularly when using anionic dyes (listed in the Color Index under the descriptions Direct Dyes and Acid Dyes).

In the Examples, parts and percentages are by weight.

EXAMPLE 1

20 Parts of the distillation residue from the industrial preparation of 4,4'-diaminodiphenylmethane, 30 parts of a 30% strength aqueous formaldehyde solution (hereafter referred to for brevity simply as formaldehyde solution) and 41.6 parts of sodium bisulfite in 200 parts of water were stirred for 3 hours at 100° C. Small amounts of an insoluble residue were then filtered off.

The resulting mixture is hereafter referred to as component 1.

12 Parts of urea were added to the whole of component 1 and 40 parts of formaldehyde solution were then added dropwise in the course of 1 hour at 50° C. The mixture was then stirred for 1 hour at 70° C.

The resulting solution was employed directly for the retanning of chrome side leather:

100 Parts of chrome side leather were washed for 10 minutes with 300 parts of water at 30° C. in a kicker. The water was then drained off. Thereafter, the leather was neutralized by drumming for 60 minutes in 100 parts of water, containing 2 parts of sodium formate and 0.5 part of sodium bicarbonate, at 30° C. The liquor was then again drained off. A further 100 parts of water at 40° C. were then added to the leather in the kicker. An amount of tanning agent solution corresponding to 5% of solids was then added to this liquor and the leather was drummed for a further 120 minutes, at 40° C. The liquor was then drained off and the leather was dyed by drumming for 30 minutes at 60° C. with a fresh liquor containing 0.5 part of Acid Brown 161 in 100 parts of water. Finally, the leather was fatliquored with a commercial fat based on a sulfited fish oil, by drumming for 60 minutes, and 1 part of formic acid was then added. After a further 30 minutes' drumming, the liquor was drained off and the leather was washed with cold water and then dried. Following exactly the same method, four similar pieces of leather were retanned, for comparison, using instead of the tanning agent according to the invention 5% respectively of a commercial tanning agent based on phenolsulfonic acid/urea/formaldehyde, naphthalenesulfonic acid/formaldehyde, naphthalenesulfonic acid/dihydroxydiphenylsulfone/formaldehyde and naphtholsulfonic acid/phenol/formaldehyde. The leather retanned by the process according to the invention proved to be dyed substantially deeper than any of the comparative samples.

EXAMPLE 2

20 Parts of formaldehyde solution were added in the course of 30 minutes to 281.6 parts of component 1 (see Example 1) and 49.2 parts of sodium β-naphtholsulfonate at 50° C. Stirring was then continued for 30 minutes at 50° C. and 2 hours at 100° C. 41.6 Parts of sodium bisulfite were then added and 40 parts of formaldehyde solution were introduced dropwise. Finally, the mixture was stirred for 2 hours at 100° C. The tanning agent was isolated by spray drying.

100 Parts of chrome side leather were retanned as follows with the tanning agent powder obtained: First, the leather was washed and neutralized as described in Example 1. The leather was then retanned, by a method similar to Example 1, with 2 parts of the tanning agent according to the invention and 3 parts of mimosa extract. Thereafter, the procedure followed was as described in Example 1, except that dyeing was carried out with 0.5 part of Acid Brown 165. For comparison, a similar piece of leather was retanned with 2 parts of a commercial tanning agent based on naphthalenesulfonic acid/formaldehyde and 3 parts of mimosa extract and was then dyed and fatliquored as described above. The leather retanned by the process according to the invention once again proved to be substantially more deeply dyed.

EXAMPLE 3

144 Parts of β-naphthol and 127 parts of 96% strength sulfuric acid were stirred for 2 hours at 110°–115° C. The mixture was then cooled and 192 parts of water were added dropwise at a rate such that the temperature did not rise above 100° C. Finally, 29 parts of acetic acid and 6 parts of a 25% strength aqueous ammonia solution were added dropwise. 50 Parts of this mixture (=component 2) were precondensed with 10 parts of formaldehyde solution for 30 minutes at 100° C. and a mixture of 140.8 parts of component 1 and 15 parts of 50% strength sodium hydroxide solution was then added slowly at 50° C. 20 parts of formaldehyde solution were then slowly added dropwise in the course of 30 minutes at 50° C. Thereafter, the batch was stirred for 30 minutes at 70° C., 30 minutes at 90° C. and finally 30 minutes at 100° C. After having added 100 parts of water, the mixture was cooled.

The resulting solution was employed as follows for retanning: Following the method described in Example 1, 100 parts of chrome side leather were washed and neutralized. 100 Parts of water at 40°, sufficient tanning agent solution to correspond to 5% of solids, and 0.5 part of Acid Black 208 were then added to the leather. By drumming for 120 minutes, the leatner was simultaneously retanned and dyed. Thereafter, the leather was fatliquored in a fresh liquor of 100 parts of water at 60° C., and processed further, as described in Example 1. For comparison, a similar leather was treated in the same manner except that the tanning agent according to the invention was replaced by a commercial tanning agent based on naphthalenesulfonic acid/dihydroxydiphenylsulfone/formaldehyde. The result was similar to Example 1.

EXAMPLE 4

20.8 Parts of technical-grade naphthalenesulfonic acid and 10 parts of formaldehyde solution were stirred for 30 minutes at 100° C. A mixture of 140.8 parts of component 1 and 15 parts of 50% strength sodium hydroxide solution was then run in slowly at 50° C. 20 parts of formaldehyde solution were then added dropwise and the mixture was stirred for 1 hour at 100° C.

The resulting tanning agent solution was employed as described in Example 1, except that in place of 100 parts of chrome side leather, 100 parts of chrome calf leather were retanned and dyed. The result was similar to Example 1.

EXAMPLE 5

20.8 Parts of technical-grade naphthalenesulfonic acid, 12.5 parts of 4,4'-dihydroxydiphenylsulfone, 20 parts of formaldehyde solution and 20 parts of water were stirred for 30 minutes at 100° C. A mixture of 140.8 parts of component 1 and 15 parts of 50% strength aqueous sodium hydroxide solution was then run in at 50° C. 10 Parts of formaldehyde solution were then added dropwise, after which the mixture was stirred for 30 minutes at 100° C. This tanning agent, when used in accordance with the method and formulation described in Example 1 again gave leather with very good dye receptivity.

EXAMPLE 6

94 Parts of phenol and 100 parts of 96% strength sulfuric acid were stirred for 4 hours at 100° C., and then diluted with 40 parts of water at 75° C.; this mixture is referred to as component 3. A mixture of 140.8 parts of component 1 and 12 parts of 50% strength sodium hydroxide solution was slowly run into 23.4 parts of component 3 at 50° C. 20 parts of formaldehyde solution were then added dropwise in the course of 30 minutes at 100° C. Stirring was continued for 30 minutes at the same temperature, 24 parts of urea were added and the batch was then stirred for 1 hour at 50° C., 1 hour at 70° C. and 75 minutes at 95° C.

100 Parts of chrome-tanned sheep leather having a shaved thickness of 0.5 mm were treated with the above tanning agent using a formulation similar to that described in Example 2. Once again, the leather obtained had very good dye receptivity.

EXAMPLE 7

100 Parts of water, 41.6 parts of sodium bisulfite, 40 parts of formaldehyde solution and 21.4 parts of o-toluidine were stirred for 1 hour at 100° C. 203 Parts of this reaction mixture (=component 4) were mixed with 100 parts of component 2. 10 parts of formaldehyde solution were then added dropwise in the course of 30 minutes at 40° C. The batch was stirred for 1 hour at 70° C. and 22 parts of 50% strength sodium hydroxide solution were then added.

When used in a formulation similar to that of Example 1, the tanning agent gave a full leather, having good dye receptivity.

EXAMPLE 8

10 Parts of formaldehyde solution were added dropwise in the course of 30 minutes to a mixture of 203 parts of component 4 and 12 parts of urea at 50° C. 11.75 parts of phenol were then added and a further 10 parts of formaldehyde solution were introduced dropwise in the course of 30 minutes at 50° C. 5 parts of 96% strength sulfuric acid and 20.8 parts of sodium bisulfite were then added and the batch was stirred for 2 hours at 70° C.

The tanning agent produced, when used in the formulation described in Example 3, on chrome-tanned goat leather of shaved thickness 1.0 mm, gave a leather of very good dye receptivity.

EXAMPLE 9

20.8 Parts of technical-grade naphthalenesulfonic acid and 30 parts of formaldehyde solution were stirred for 30 minutes at 100° C. 203 Parts of component 4 and 15 parts of 50% strength sodium hydroxide solution were then run in simultaneously at 50° C. After having stirred the mixture for 1 hour at 50° C., 20 parts of formaldehyde solution were added dropwise in the course of 30 minutes at 70° C. 20.8 Parts of sodium bisulfite were then added and the mixture was stirred for 1 hour at 100° C. Finally, 24 parts of urea were added, and the batch was stirred for 1 hour at 70° C. The resulting tanning agent, when used in the formulation described in Example 1, gave a full leather of good dye receptivity.

EXAMPLE 10

100 Parts of water, 34.6 parts of sulfanilic acid, 15 parts of 50% strength sodium hydroxide solution, 10 parts of formaldehyde solution and 10.4 parts of sodium bisulfite were stirred for 1 hour at 100° C. 6 parts of urea were then added and 20 parts of formaldehyde solution were introduced dropwise in the course of 2 hours at 50° C. The mixture was then stirred for 1 hour at 70° C. and 1 hour at 90° C. The resulting tanning agent, when used in the formulation described in Example 1, gave a soft leather of very good dye receptivity.

EXAMPLE 11

100 Parts of water, 34.6 parts of sulfanilic acid, 15 parts of 50% strength sodium hydroxide solution, 10 parts of formaldehyde solution and 10.4 parts of sodium bisulfite were stirred for 1 hour at 100° C. 6 parts of urea were then added and 14.4 parts of isobutyraldehyde were introduced dropwise in the course of 2 hours at 50° C. The mixture was then stirred for 1 hour at 70° C. and 1 hour at 90° C. The resulting tanning agent, when used in the formulation described in Example 1, gave a soft leather of very good dye receptivity.

EXAMPLE 12

200 Parts of water, 27.4 parts of anthranilic acid, 40 parts of formaldehyde solution and 41.6 parts of sodium bisulfite were stirred for 1 hour at 100° C. 40 Parts of formaldehyde solution were then added dropwise in the course of 30 minutes at 50° C. The mixture was then stirred for 1 hour at 50° C., 30 minutes at 70° C. and 30 minutes at 100° C. The resulting tanning agent, when used in the formulation described in Example 1, gave a soft leather of very good dye receptivity.

EXAMPLE 13

The procedure described in Example 10 was followed, except that in place of 6 parts of urea 8.4 parts of dicyandiamide were employed. A tanning agent having similar properties to that described in Example 10 was obtained. The resulting tanning agent, when used in the formulation described in Example 1, gave a soft leather of very good dye receptivity.

EXAMPLE 14

The procedure described in Example 10 was followed, except that in place of 6 parts of urea 10.3 parts of biuret were employed. The tanning agent obtained had similar properties to that described in Example 10 and, when used in the formulation described in Example 1, gave a soft leather of very good dye receptivity.

EXAMPLE 15

The procedure described in Example 10 was followed, except that in place of 6 parts of urea 12.6 parts of melamine were employed. The result corresponded to those of the two preceding Examples.

EXAMPLE 16

203 Parts of component 4 and 55 parts of the cloudy solution of a condensation product of 20 parts of urea, 50 parts of formaldehyde solution, 15 parts of melamine and 15 parts of water were reacted together by stirring for 4 hours at 90° C. The mixture was then diluted with 140 parts of water and the pH was brought to 5 with formic acid. The resulting tanning agent solution was employed directly, by a method similar to Example 1, for retanning of chrome-tanned side leather. The result also corresponded to that of Example 1.

We claim:

1. A tanning agent comprising a condensation product of an aliphatic $C_1$-$C_4$ aldehyde with an aromatic methylene sulfonic acid containing an amino group and having the formula

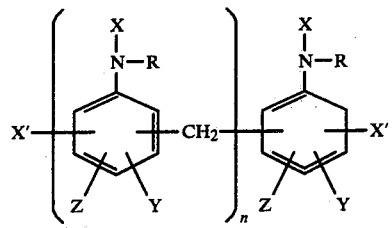

where X and X' are independently H, $-CH_2-SO_3H$ or $-CH_2-OH$, Y is H or $-CO_2H$ and Z is H, $CH_3$, R is H or $C_{1-4}$-alkyl and n is from 0 to 10, with the proviso that at least one methylene sulfonic acid group is present in the molecule.

2. A tanning agent as claimed in claim 1 obtained from a mixture of two or more of the aldehydes and/or a mixture of two or more of the acids.

3. A tanning agent as claimed in claim 1, wherein the condensation is performed in the presence of urea, biuret, dicyandiamide or melamine or a water-soluble condensate of any of these compounds with formaldehyde.

4. A tanning agent as claimed in claim 3, wherein the condensation is performed in the presence of a phenol or naphthol, a methyl derivative of a phenol or naphthol, a sulfonic acid of a phenol or naphthol, a naphthalenesulfonic acid or a water-soluble condensate of any of these compounds with formaldehyde.

5. A tanning agent as claimed in claim 1 wherein the molar ratio of the aromatic methylene sulfonic acid containing an amino group to the aldehyde of 1 to 4 carbon atoms is from 1:0.5 to 1:6.

6. A process for the preparation of a tanning agent for the retanning of a mineral-tanned hide by condensing an aliphatic aldehyde of 1 to 4 carbon atoms, for from ½ to 24 hours in aqueous solution at 30°-100° C. and pH 1-8, with an aromatic methylene sulfonic acid in the presence or absence of one or more compounds selected from urea, biuret, dicyandiamide, melamine, their reaction products with formaldehyde, phenols, naphthols, methyl derivatives and sulfonic acids of phenols and naphthols, naphthalenesulfonic acids and their reaction products with formaldehyde, wherein the aromatic methylene sulfonic acid employed contains an amino group and has the general formula

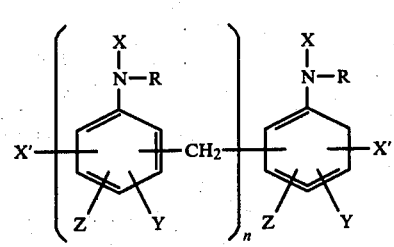

where X and X' are independently H, $-CH_2-SO_3H$ or $-CH_2-OH$, Y is H or $-CO_2H$ and Z is H, R is H or $C_{1-4}$-alkyl and n is from 0 to 10, with the proviso that one or both of the radicals X and X', is a methylene sulfonic acid group.

7. A process as claimed in claim 6, wherein a mixture of
(a) the reaction product of aniline or toluidine with from 1 to 6 moles of formaldehyde and from 1 to 6 moles of sodium bisulfite is heated with
(b) an aqueous solution, containing free formaldehyde, of a condensation product of formaldehyde with from 0.3 to 1 mole of urea and from 0.1 to 0.3 mole of melamine per mole of formaldehyde, in the weight ratio of component (a) to component (b) (each calculated as solids) of from 1:05 to 1:5, in aqueous solution at a pH of from 3.5 to 8 for from 1 to 10 hours at 60°–100° C.

8. A tanning agent when manufactured by a process as claimed in claim 6.

9. A process for retanning a mineral-tanned hide comprising treating it with an aqueous solution of a tanning agent as claimed in claim 1.

10. A process as claimed in claim 9 wherein a liquor length of 30 to 1000 percent based on the shaved weight of leather to be retanned, a pH of 4 to 6.5, a temperature of 20° to 60° C., a retanning time of 15 to 120 minutes and an amount of tanning agent of 0.5 to 10 percent based on shaved leather weight are employed.

11. Leather which has been tanned or retanned with a tanning agent as claimed in claim 1.

12. The tanning agent of claim 1, wherein $n=0$.

13. The tanning agent of claim 3 wherein the sum of the components mentioned therein is from 0 to 90% by weight of the aromatic acid containing an amino group.

14. The tanning agent of claim 4 wherein the sum of the components mentioned therein is from 0 to 90% by weight of the aromatic methylene sulfonic acid containing an amino group.

* * * * *